United States Patent [19]

Lenz et al.

[11] 3,963,831

[45] June 15, 1976

[54] PROCESS FOR THE MANUFACTURE OF ALKALI METAL HYDRIDES IN COARSE POWDER FORM

[75] Inventors: Arnold Lenz, Cologne-Stammheim; Walter Rogler, Bonn, both of Germany

[73] Assignee: Dynamit Nobel Aktiengesellschaft, Troisdorf, Germany

[22] Filed: Dec. 5, 1973

[21] Appl. No.: 422,057

Related U.S. Application Data

[63] Continuation-in-part of Ser. No. 263,071, June 15, 1972, abandoned, which is a continuation-in-part of Ser. Nos. 57,415, June 16, 1970, abandoned, and Ser. No. 202,654, Nov. 26, 1971, Pat. No. 3,919,405, which is a continuation-in-part of Ser. No. 730,942, May 21, 1968, abandoned.

[30] Foreign Application Priority Data

Aug. 14, 1973 Germany............................ 2340997

[52] U.S. Cl.................................. 423/646; 427/220
[51] Int. Cl.²............................................. C01B 6/04
[58] Field of Search..................... 423/646; 117/100; 252/188; 427/220

[56] References Cited

UNITED STATES PATENTS

| | | | |
|---|---|---|---|
| 1,796,265 | 3/1951 | Freudenberg et al............... | 423/646 |
| 2,372,671 | 4/1945 | Hansley............................. | 423/646 |
| 2,504,927 | 4/1950 | Hansley............................. | 423/646 |
| 2,513,997 | 7/1950 | Gibb................................... | 252/88 |
| 3,281,362 | 10/1966 | DiSapio.............................. | 252/25 |
| 3,407,089 | 10/1968 | Sampson et al.................... | 427/216 |

OTHER PUBLICATIONS

Hurd, "Chemistry of the Hydrides," 1952, pp. 27, 30, 31.

*Primary Examiner*—Herbert T. Carter
*Attorney, Agent, or Firm*—Burgess, Dinklage & Sprung

[57] ABSTRACT

Alkali metal hydrides, obtained by reacting alkali metals in liquid form with hydrogen in the presence of alkali metal hydrides, are obtained in coarsely crystalline form by continuously introducing into the reaction vessel containing constantly agitated alkali metal hydride only so much alkali metal in liquid form which corresponds stoichiometrically to the amount of hydrogen reacted and maintaining the unreacted metal concentration at 3 weight percent or less of the pre-introduced metal hydride present. In preferred aspect, the pre-introduced metal hydride is agitated by mixing means at a circumferential velocity of 0.5 to 2 meters/second and maintained at 250°–310°C., to yield hydride crystals in the range of 100 to 1000 microns. The hydride thus obtained may be ground in an inert hydrocarbon mixture to a finer particle material still having a relatively low surface area and recovered as a stabilized, non-sticking, non-self ignitable alkali metal hydride product.

15 Claims, 1 Drawing Figure

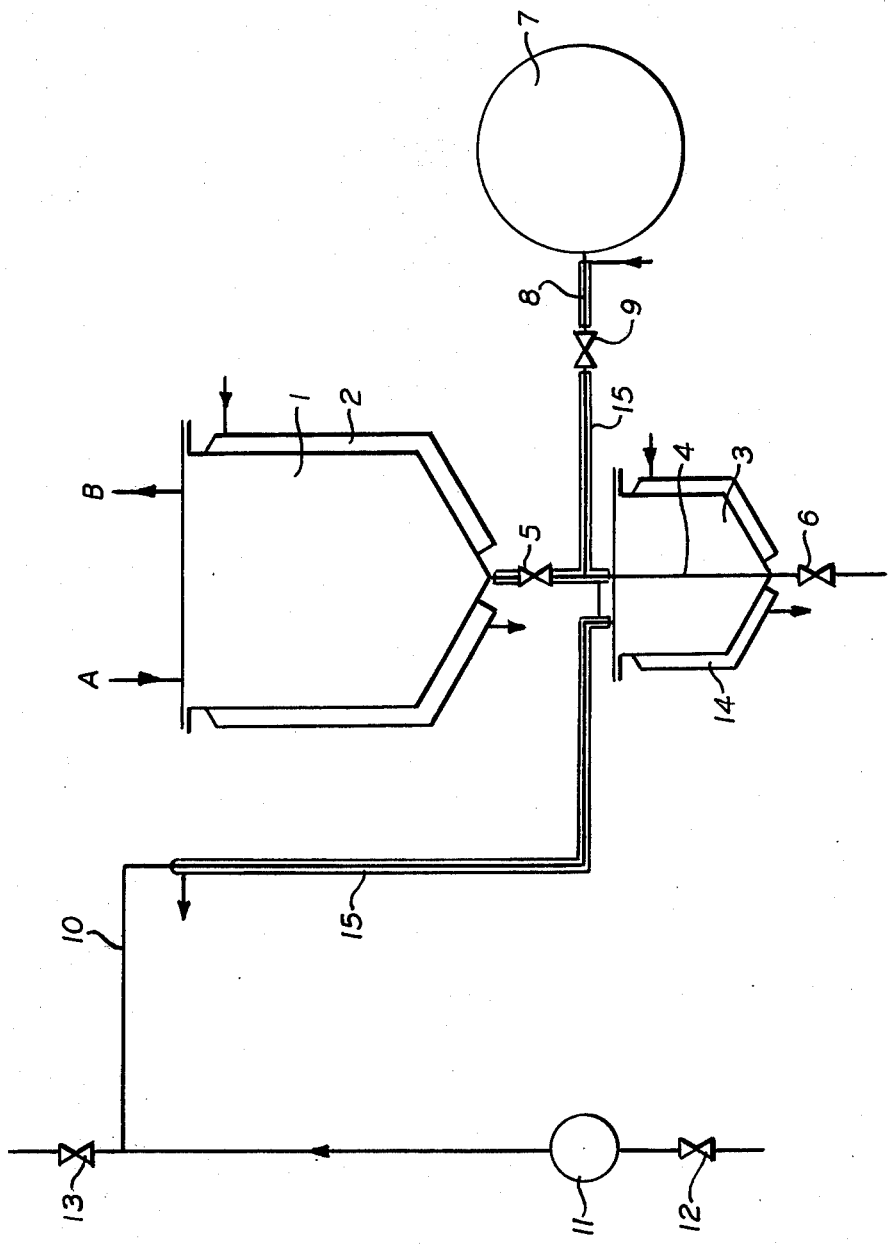

PROCESS FOR THE MANUFACTURE OF ALKALI METAL HYDRIDES IN COARSE POWDER FORM

This application is a Continuation-In-Part of copending application Ser. No. 263,071 filed June 15, 1972, which in turn is a continuation-in-part of Ser. No. 57,415 filed June 16, 1970; both now abandoned; and of copending Ser. No. 202,654, filed Nov. 26, 1971, now U.S. Pat. No. 3,919,405, which in turn is a continuation-in-part of Ser. No. 730,942 filed May 21, 1968, now abandoned.

This invention relates to alkali metal hydrides in a novel physical form, i.e., in coarsely crystalline powder form, and to a process for preparing same.

The alkali metal hydrides hitherto known are only used with difficulty in the industry, because of safety problems. For transport, storage, filling and the like, cumbersome safety measures must be taken. To avoid extremely hazardous conditions, the known, finely crystalline, hydrides can only be introduced to commerce suspended in oils, i.e., in impure form. Thus, they are not usable as reducing agents for the production of very pure products.

However, the alkali metal hydrides produced in accordance with our invention, are coarsely crystalline, free flowing, not self-ignitable in air and so safe in handling that they can be used in commerce in pure form and, therefore, in many areas of use, which were previously precluded. Due to their purity, they can be used, for example, as reducing agents for the production of pharmaceuticals and other products requiring excellent purity. The product produced in accordance with the invention is thus far superior to the hitherto known alkali metal hydrides.

The manufacture of alkali metal hydrides, especially of sodium hydride, is conventionally effected by reacting the corresponding elements, i.e., by reacting the molten alkali metal with hydrogen. According to known procedures it is customary to maintain the reaction mixture in constant agitation in the reaction vessels through suitable scrapers or other mixing means. To obtain a particular degree of distribution of the alkali metals, which are frequently introduced in liquid form into the reaction vessel through a heated funnel, an inert solid material is introduced which acts as a diluent during the reaction.

However, the known processes for making alkali metal hydrides in powder form are subject to substantial drawbacks because the alkali metal hydride which forms encapsulates the not yet reacted alkali metal and effectively withdraws the alkali metal from further reaction with hydrogen. The reaction is often brought to a halt through this phenomenon or slowed to such an extent that reaction rates sufficient for economical carrying out of the process can no longer be attained. Many widely different means have been used to mitigate or obviate these drawbacks; for instance, it has been proposed to blow hydrogen across the surface of the molten metal and to immediately remove the alkali metal hydride formed from the upper surface of the melt. This process, however, has the disadvantage that one must work with a high excess of hydrogen and this hydrogen must be freed of hydride dust and must be compressed. It is also known to speed the reaction by the addition of foreign matter such as phenol, fatty acids or salts thereof, which effectively activate the surface or have a reticulating effect either per se or through reaction product formed by further reaction with the alkali metals. These additives, however, contaminate the alkali metal hydrides which must, therefore, be subjected to an additional and costly purification step. It has also been attempted to expose the surface of the alkali metal for further reaction by mechanical size reduction. However, in such a process the metal hydrides are formed in a very fine particle distribution and are thus difficult to handle in practice because of their inflammability.

Lastly, it is known from German Pat. No. 490,077 to use alkali metal hydride as a diluent and extender in the reaction of fluid, finely divided alkali metal with hydrogen. All of these known methods, however, have the same drawback, viz., that a comparatively fine crystalline alkali metal hydride is obtained which is not free-flowing, and which easily selfignites in air, so that difficult and expensive safety measures are indispensable in order to store and transport these finely crystalline alkali metal hydrides and pour them from one container into another. For reasons of safety, it has accordingly been possible only to suspend the finely crystalline, reactive, pure alkali metal hydrides in relatively large amounts of oil for marketing purposes. Consequently, the use of alkali metal hydride in highly refined form has been virtually impossible, because only through very expensive purification is it possible to obtain an oil-free product that will not self-ignite in air.

A non-self-igniting, finely crystalline sodium hydride having grain sizes of 10 to 15 $\mu$ is known, which is obtained by adding traces of carbon monoxide to the hydrogen prior to the reaction with sodium. This product, however, also has evident disadvantages, since its specific surface area is at least one power of ten greater than that of the conventional products. Furthermore, this sodium hydride is inactive due to surface passivation, which is to be attributed to the elemental carbon and to the formiates, oxalates and carbonates which undesirably form in the reaction between carbon monoxide and sodium hydride. The product accordingly never has a purity of 100%.

These disadvantages of heretofore known processes for making alkali metal hydrides are substantially obviated by means of the present invention.

The present invention thus provides a free-flowing alkali metal hydride which is not self-igniting in air and is uncontaminated by foreign substances, and which is either produced in such coarse crystalline form that no stabilization with oil is necessary, or else, when crushed, requires such small amounts of oil for stabilization that the alkali metal hydrides are non-sticking and nevertheless non-self-igniting and, furthermore, the amount of oil used being so small that it is easily removable.

Essentially, the process of the instant invention comprises introducing alkali metal, especially sodium, into a reaction vessel, together with hydrogen, in stoichiometric ratio and in only such an amount that a quantitative reaction of the starting materials takes place, and carrying out the reaction in the presence of previously introduced alkali metal hydride and adding only so much liquid alkali metal into the pre-introduced alkali metal hydride, which is kept in constant agitation in the reaction vessel, that the amount of free alkali metal, e.g., sodium, relative to pre-introduced alkali metal hydride, e.g., sodium hydride, is maintained below 3 percent by weight, preferably from 0.5 to 1 percent by weight.

In preferred aspect, the pre-introduced alkali metal hydride is kept in agitation by mixing means having a circumferential velocity of from 0.5 to 2 meters/second and is maintained at a temperature of 250° to 310°C., to yield alkali metal hydride crystals in the range of 100 to 1000 microns.

In this process there is obtained a coarsely crystalline and free flowing alkali metal hydride which is easily handled and there is achieved quantitative conversion of both reactant components, i.e., hydrogen and the alkali metal. It is critical to maintain the free alkali metal concentration set forth above under the indicated level because, at higher concentrations, the product obtained is unsatisfactory (see, e.g., U.S. Pat. Nos. 1,796,265 and 2,372,671 in which higher concentrations are contemplated).

The grain size of the hydride formed is directly correlated with the grain size of the pre-charge, i.e., alkali metal hydride pre-introduced into the reaction vessel when operating at such higher concentrations. However, in the instant invention, it is possible to obtain a larger grain in the final product of the process of this invention than the grain size of pre-introduced hydride.

The process of the invention is not subject to the disadvantages of prior manufacturing methods: because of the precise dosing of the liquid alkali metal, the total amount of which depends on the size of the reaction vessel and on the level of reaction mixture in the reaction vessel, the liquid metal is finely distributed by seeping through the pre-introduced and constantly agitated hydride and is fully reacted, because of this fine distribution, with the hydrogen introduced without forming a pool of liquid metal at the bottom of the reaction vessel which would agglomerate and thus be withdrawn from effective and quantitative reaction. In addition, because of the absence of any foreign matter or addends a very pure product is obtained requiring no further purification.

In effecting the process of the invention it is advantageous to pre-introduce alkali metal hydride to fill at least 10 percent of the volume of the reaction vessel prior to dosing in the liquid alkali metal. Preferably, the reaction vessel is filled to about one-third with pre-introduced alkali metal hydride. In this process the temperature used is above the melting point of the alkali metal to be reacted and such that the hydrogen partial pressure of the alkali metal hydride is smaller than the hydrogen pressure applied to the reaction. It has been found that the process may be performed particularly successfully if the fluid alkali metal and the hydrogen are introduced continuously into the alkali metal hydride at temperatures ranging between 275° and 300°C. The hydrogen pressure at which the hydrogen is introduced into the reaction is not narrowly critical; it is limited only at the upper end by the varying pressures that can be tolerated by the reaction vessel used. In carrying out the instant process, one may advantageously use pressure tight reaction vessels equipped with suitable agitating means to effect a turning over of the pre-introduced as well as product alkali metal hydride while simultaneously mixing and powdering same. Suitable, in addition to mixing and kneading vessels, are vessels with worm paddles or scraper.

In place of using already formed alkali metal hydride to constitute the pre-introduced material it is possible to form the "pre-introduced" alkali metal hydride directly in the reaction vessel at commencement of the process. This can be achieved by employing a pressure tight vessel equipped with an anchor (rotary) type stirrer fully reaching the inner surface of the vessel, and equipped with crushers and a heating mantle, and introducing a small amount of liquid metal which is so dosed that it is just grasped by the stirrer. After the dry air is replaced by a dry inert gas, suitably nitrogen, the nitrogen is then replaced by hydrogen and the reaction vessel is heated to a temperature above the melting point of alkali metal. After the stirrer is turned on additional hydrogen corresponding to the consumption during hydride formation is supplied so that the hydrogen pressure remains constant during the reaction. The reaction is initially rather slow but through the mixing in of the hydride forming on the surface of the alkali metal into the liquid metal, new reactive metal surfaces are formed which, after going through a pasty intermediate stage, are transformed into a final powdered form. As soon as the powder form stage is reached the hydrogen consumption increases significantly and at this point the process according to the present invention can be carried out. Once the pre-formed alkali metal hydride is present in the reaction vessel, it is advantageous for subsequent runs to not withdraw all of the alkali metal hydride formed from the reaction vessel but to leave the reactor partially full of alkali metal hydride so that the process of the invention can then be conducted in batch fashion as well as continuously without the need for pre-introducing alkali metal hydride as described above.

Apparatus suitable for carrying out this invention is conventional in the art, e.g., as disclosed in the Jackson patent, U.S. Pat. No. 2,405,580 which teaches molten alkali metal forwarding means, as does the Vining patent, U.S. Pat. No. 2,474,021. More preferred, however, is apparatus disclosed and claimed in copending Ser. No. 46,511 filed June 15, 1970, or German DOS No. 1,944,601, in which a "gas pad" is used to displace molten alkali metal from a dosing container into the reaction vessel. It is desirable that a hydrogen pressure ranging between 2 to 10 atmospheres gauge pressure, preferably between 3 and 6 atmospheres, prevail in the reaction vessel. Such equipment is illustrated in the accompanying drawing.

With reference to the drawing, vessel 1 is used for melting the alkali or alkaline earth metal under the protective atmosphere of a gas. As such a protective gas there can be used dry nitrogen but also hydrogen. The container 1 is constantly flushed with the protective gas which flows in at point A and flows out at point B. If the temperature of the melt (e.g., 120° to 150°C in the case of sodium) permits, it is possible to use dry air as the protective gas.

The heating means used to heat vessel 1 depends on the temperature needed to melt the metal which can reach about 800°C. and higher in the case of alkaline earth metals and can be hot oil or electrical heating means. The heating means shown in the drawing is indicated as heating mantle 2 surrounding melt vessel 1. Alternatively it is, of course, possible to provide a heating means within the melt vessel 1. Melt container 1 is connected with dosing container 3 disposed below container 1 by pipe 4 which extends into dosage container 3 and terminates near the bottom thereof. Locking valve 5 permits interruption of flow through line 4 into the dosing container. At the bottom of dosing container 3 there is provided an outlet valve 6 for cleaning purposes. Pipe 4 is connected at a point downstream from valve 5 but upstream from the dosing container 3 with a pipe means 8 fitted with valve 9 which leads to the reaction vessel 7. Pipe 10 which is connected to the dosing container 3 serves to convey the pressurizing gas which is introduced through the regulating valve 12 and the flow meter apparatus 11 from a suitable pressurizing gas source (not shown). In addition, pipe 10 is fitted at a point above the top of melt container 1 with an escape valve 13 which provides for escape of gas to the atmosphere. Escape valve 13 can be in the form of a check valve or other valve means which prevent the introduction of atmospheric air into pipe 10.

Before the molten metal is forwarded through pipe 4 into the dosing container 3, this container and pipes 4, 8 and 10 are flushed with nitrogen, hydrogen or the like. Subsequently, valve 9 is closed and valve 5 and escape valve 13 are opened so that the molten metal can flow into dosing container 3 and fill this container as well as the connecting pipes until equilibrium is reached between the molten metal in container 1 and that contained in line 10. Escape valve 13 through which the gas displaced by the molten metal has escaped is then closed along with valve 5 and the regulating valve 12 is then so set that the desired requisite gas pressure is obtained in pipe 10 for the desired amount of reactant forwarding. When valve 9 is opened the molten metal is led to the reaction vessel 7 in the desired amounts which can be smoothly controlled from zero flow. The amount of material in dosing container 3 is chosen, taking into account the amount of molten metal in the pipes, to be just so high that this amount corresponds to one charge of metal hydride formed so that the dosing container 3 is filled in the same cycle during which the reaction vessel 7 is emptied. The amount of material in melt container 1, however, is chosen to be somewhat higher than such a product charge so that after filling of dosing container 3 and the pipes sufficient molten metal remains in container 1 to improve heat transfer in melting the solid metal introduced in the next feed charge. Once the dosage is adjusted by means of regulating valve 12 the entire apparatus can be left to operate independently because the process in effect terminates itself after the reactants are delivered as described above. To obviate cooling of the molten metal in dosing container 3 as well as in the pipes and valves and to obviate the possibility of the solidification of the metal at these places, various parts of the equipment are equipped with heating means, such as mantles 14 and 15, to the extent that they come into contact with the molten metal. It is sometimes advantageous to heat the molten metal already prior to entry into the reaction vessel 7 which is separately heated by heating means not shown.

The choice of the reaction temperature, as well as of the reaction pressure, depends on particular conditions needed in individual cases. Generally, the formation of the hydrides of alkali or alkaline earth metals is possible at a temperature between the melting point of such metals and the temperature at which the hydrides decompose thermally. The lower limit for the hydrogen pressure in the reaction vessel is determined by the hydrogen partial pressure of the particular hydride being formed whereas the upper limit on the reaction pressure is limited only by the cost of very high pressure apparatus. As a typical example it has been found efficient to operate, in the formation of sodium hydride at a temperature from 290° to 300°C. and at a pressure of about 4 atmospheres (gauge).

In the performance of the preferred aspect of the invention, viz., using certain mixing conditions, conventional low-speed circumferential mixers may be used, such as for example anchor stirrers and mixers using plowshare-like mixing tools, i.e., mixers whose mixing tools pass along the vessel walls very closely thereto, so that shearing and frictional forces may act upon the reaction mixture without simultaneously producing a chopping effect. This is prevented by setting the circumferential speed of the mixing tool within the range specified above which is essential to the advantageous performance of the process.

Without intending to adhere to any particular theory, it is assumed that, under the described conditions of the process the hydride grain is built up in layers, in that the continuously fed sodium runs onto the foreplaced primary grain to form a sodium film which is completely hydrated, whereupon another sodium film is laid about the grain, which in turn is hydrated, etc. Under the action of the marginal mixing tools, however, an equilibrium becomes established without the formation of too coarse a grain which would indicate an excessively slow reaction rate. In any case, the crystals must nevertheless have sufficient time for the formation of the shell-like sodium layers and for the complete reaction to the hydride, which the person skilled in the art can easily bring about by properly adjusting the stirring speed and hydrogen pressure as well as the temperature.

In the performance of the preferred embodiment of the process of the invention it is also desirable to charge the reaction vessel with previously formed alkali metal hydride to at least 10 percent of its capacity before metering-in the fluid alkali metal and hydrogen. It is advantageous to fill the vessel to about one-third of its capacity with alkali metal hydride. The concentration of alkali metal in the pre-introduced alkali metal hydride is also significant when proceeding in accordance with the preferred aspect of the invention, e.g., in preparing sodium hydride, the content of unreacted sodium during the reaction is not to exceed 3% by weight, and preferably it is not to exceed 0.5 to 1% by weight.

If the process is performed in the above-described manner, a coarsely granular product having grain sizes ranging between 100 and 1000 $\mu$ is first obtained, which may be packed, stored and transported without special precautions except for nitrogen gas shielding, but on account of its coarseness it may not have an entirely adequate speed of reaction in some cases for certain special reactions. Now, in order to obtain from it an alkali metal hydride that on the one hand will be sufficiently reactive, but on the other hand will have the advantage of the coarse grained material of being non-sticking as well as non-self-igniting, this coarsely crystalline alkali metal hydride is, in accordance with the invention, ground in a mixture of inert hydrocarbons to the desired grain size of, for example 15 microns, and then the lower-boiling hydrocarbon is removed by evaporation and the stabilized, finely crystalline alkali metal hydride is obtained. In removing the lowerboiling hydrocarbon by evaporation, care must be taken to see that a maximum temperature of 90°C is not exceeded, this being achieved, if desired, by the application of a vacuum. This finely granular hydride having a grain size of 15 microns, for example, that is to say a grain size like that of the finely crystalline products which are obtained by prior-art methods but which are self-igniting and can be stabilized only with large amounts of oil, has the great advantage that it is not porous, and has a smaller specific surface area and thus requires substantially lesser amounts of oil for its stabilization than the hydrides prepared by prior-art methods. Precisely on account of the great specific surface area of the porous sodium hydride prepared directly in finely powdered form, large amounts of paraffin oil are required in order to prepare a free-flowing, non-self-igniting powder. For example, for a grain size of about 10 microns up, 50 parts of sodium hydride and 50 parts of paraffin oil are required. On the other hand, if the sodium hydride ground to the same grain size in accordance with the invention is used, substantially less paraffin oil is required, depending on the actual grain size, in order to have a finely granular, non-sticking end product that is not self-igniting in air. Thus the product of the invention contains substantially less inert ballast than the products prepared in accordance with the state of the art.

To distinguish the finely crystalline product prepared in accordance with the invention, the specific crystal surface area for the average crystal diameter and the amount of paraffin oil per gram of sodium hydride may be given as follows:

a) $\dfrac{\text{Crystal surface area}}{\text{Crystal diameter}} = \dfrac{4{,}600}{1} \dfrac{m^2}{\mu}$ b) $\dfrac{\text{Amount of paraffin oil}}{\text{Crystal diameter}} = \dfrac{2.5}{1} \dfrac{g}{\mu}$ A sodium hydride powder in accordance with the invention, having an average grain size of 10 $\mu$, has a value of 0.460 m²/g NaH for a) and of 0.25 g paraffin oil per gram of NaH for b). A comparable sodium hydride prepared directly in fine powder form by a prior-art method and having a grain size also of 10 $\mu$ has a substantially greater specific crystal surface area and accordingly requires 0.75 g of paraffin oil per gram of NaH for protection against self-ignition upon contact with air.

The method of the invention offers the additional technical advance that a completely safe, coarsely crystalline sodium hydride may be taken from the reaction vessel and suspended in an oil-and-benzine mixture for fine grinding, while a finely crystalline hydride prepared by direct synthesis is usually suspended in an oil-and-benzine mixture in the reaction vessel upon completion of the reaction, on account of the dangers involved in emptying it into the other containers, and consequently the reaction vessel is completely tied up for a period of time.

The finely crystalline alkali metal hydrides produced in accordance with the invention are distinguished by an extraordinarily fine protective coating of liquid hydrocarbons which suffices to provide effective protection against air and protection during the handling of the hydrides, for example in the application thereof. Amazingly, the hydride thus coated is so non-sticking that it is virtually a powder of good free-pouring quality. When it is to be used in chemical processes in which the protective coating might interfere, the coating is very easy to remove, since the paraffin floats on aqueous media and easily dissolves in organic solvents. The stabilizing coating, therefore, on account of the extremely small amount that is present, is by no means a nuisance-causing ballast substance.

The coarse product produced by the invention may be ground in a mixture consisting of a) a liquid hydrocarbon or hydrocarbon mixture inert to the alkali metal hydride and having a boiling point ranging from 220° to 400°C and b) a hydrocarbon solvent, also inert to the alkali metal hydride, having a boiling point from 20° to 160°C, to form a finely granular alkali metal hydride still having a relatively small specific surface area which, upon removal of the lower boiling hydrocarbons by evaporation up to a maximum temperature of 90°C, forms a stabilized non-sticking and also non-self-igniting alkali metal hydride product. Such a product obviates the many disadvantages of prior art products with respect to storage and handling thereof.

The prior art hydride products needed to be stored under the complete exclusion of moisture, and in the case of alkali metal hydrides, under the exclusion of atmospheric air. Storage under conditions ensuring the exclusion of moisture and atmospheric air is generally not difficult, as the hydrides can be packaged in suitable backings and satisfy the above requirements immediately after their manufacture. Difficulties, however, where often involved in their handling by the end-user, who, unlike the manufacturer, is usually not very proficient at putting into effect the necessary precautionary measures, this unfortunately being the case in most non-chemical enterprises. For this reason, the use of the alkali and alkaline earth metal hydrides has not been well established in spite of the fact that their cost might be attractive for many applications.

To avoid these problems associated with the metal hydrides, numerous attempts had been made to stabilize the hydrides particularly by applying a protective coating to the particles to seal them off against air, in order to thus permit their storage and easy handling, particularly in the end-user's establishment. Paraffin waxes, naphthalene, mineral oil, tar, Vaseline, synthetic resins and the like have been used in this connection as the coating material. It has also been proposed to coat the hydride with a mixture of a water-insoluble organic acid and a water-repellent solid substance, such as a hydrocarbon or ester, for example.

In the case of coating carried out with solids, the hydrides thus stabilized are often pressed into the form of solid cakes or pellets. This type or form of materials have the disadvantage, as regards the reactions in which they are to be used, that their reactivity is too greatly reduced by their excessively dense form. Moreover, the large amount of the coating and the insolubility of the coating in water or in solvents such as, for example alcohols, renders their use impractically slow and complicated, often times necessitating a heating step for the sole purpose of melting or dissolving the coatings.

Consequently, thin paraffin oils often are preferred for use as the protective material. In the manufacture of preparations of this kind, the procedure, as a rule, is to prepare the hydrides of the alkali metals or alkaline earth metals by the hydrogenation of the metals dispersed in these oils. Fundamentally, however, it is also possible to suspend the prepared hydrides in the oil and the desired hydride-oil mixtures can be recovered by filtration. However, the final products contain excessively large amounts of paraffin oil, and furthermore, they are very sticky and hard to handle. Also, they have the disadvantage of introducing unnecessary amounts of inert substances into the chemical process in which the hydride is to be used which substances interfere with that process as well as interfering with the use of the product of such process. This is also the case, of course, with solid protective coatings.

The following examples are illustrative of various embodiments and aspects of the invention.

EXAMPLE 1

A pressure-resistant vessel of 500 liters capacity provided with heating means, anchor stirrer, breakers, temperature measuring and filling apertures, and gas supply and exhaust lines is charged with 150 kg of finely crystalline sodium hydride having an average grain size of 50 $\mu$, and is heated to 300°C at a hydrogen pressure of 3 atmospheres gauge. Through a heated metering apparatus, fluid sodium is then continuously fed into the vessel at the rate of 6.5 kg/h. In order to maintain the hydrogen pressure of 3 atmospheres during the reaction, 3.2 normal cubic meters of hydrogen must be fed in per hour. After 20 hours the fluid sodium feed is stopped, whereupon the hydrogen consumption drops within 10 minutes to zero. This after-reaction of 10 minutes at a hydrogen consumption of about 3 normal cubic meters per hour corresponds to approximately 1.5 kg of unreacted sodium and to a sodium concentration of approximately 0.5 percent of the total amount of hydride.

The sodium hydride obtained from this reaction in accordance with the invention, having a crystal size ranging between 100 and 1000 microns, has an average crystal size of 500 microns; it is free-flowing and is not self-igniting in air.

EXAMPLE 2

The reaction vessel of Example 1 is charged with 150 kg of the powdered sodium hydride of the average grain size of 500 microns obtained in Example 1, and then the vessel is heated with stirring to a temperature of 290° to 300°C and hydrogen is fed in until a hydrogen pressure of about 3 atmospheres gauge prevails in the vessel. Then molten sodium is fed in continuously through a heated metering apparatus at a rate of 6 kg/h. 2.9 normal cubic meters of hydrogen must be fed in hourly to maintain the hydrogen pressure at about 3 atmospheres. After 20 hours the delivery of molten sodium is interrupted, whereupon the hydrogen consumption drops instantly to zero. After cooling and relieving to atmospheric pressure, 120 kg of sodium hydride of an average grain size of 500 microns is withdrawn from the reaction vessel.

EXAMPLE 3

The same procedure is followed as in Example 2, except that molten sodium is continuously fed into the vessel at a rate of 2.5 kg/h. To maintain normal pressure in the reaction vessel under these conditions, 1.2 normal cubic meters of hydrogen must be introduced per hour. After the sodium feed is stopped and the hydrogen consumption has returned to zero, newly formed sodium hydride may again be withdrawn from the reaction vessel.

EXAMPLE 4

Instead of alkali metal hydride from other production, the alkali metal hydride which is to be present at the beginning of the reaction may also be formed directly in the reaction vessel. In this case a small amount of fluid alkali metal is placed in the reaction vessel, which is of such an amount that it is just touched by the stirrer. After the dry air has been displaced by another inert gas, nitrogen for example, the nitrogen is in turn displaced by hydrogen and the reaction vessel is heated to a temperature above the melting point of the alkali metal. Hydrogen is then fed in, with stirring, as it is consumed in the formation of the hydride, so that the hydrogen pressure remains constant during the reaction. The reaction takes place at first rather slowly. By stirring into the molten metal the hydride that forms on its surface, reactive metal surface is constantly exposed until a pasty intermediate state is succeeded by a powdery final state. As soon as this state is reached, the hydrogen absorption increases considerably. The sodium hydride thus prepared is a finely crystalline powder with an average crystal size of 50 microns which is self-igniting in air. If the procedure of Example 1 is then followed, a coarsely crystalline sodium hydride having a grain size of about 500 microns is obtained from this foreplaced sodium hydride, which is free-flowing and non-self-igniting. If a previously formed alkali metal hydride is in the reaction vessel it is desirable not to remove all of the alkali metal hydride from the reaction vessel at the end of the process, but to leave some of it there so that the process of the invention may be performed both batchwise and continuously.

EXAMPLE 5

(For Purposes of Comparison)

This example describes the prior-art process. 150 g of the finely crystalline sodium hydride used as starting material in Example 1 is heated to 300°C at a hydrogen pressure of 3 atmospheres gauge. Again, fluid sodium is continuously fed in through a heated metering apparatus at a rate of 24 kg/h. To maintain the hydrogen presure during the reaction, about 11 normal cubic meters of hydrogen must be fed in per hour. After 5 hours the sodium feed is shut off, whereupon the hydrogen consumption falls to zero after about 1 hour. On the basis of the one-hour after-reaction at a hydrogen absorption of about 11 normal cubic meters per hour, about 24 kg of sodium remained unreacted, i.e., approximately 9 percent sodium with reference to the total amount of hydride.

The sodium hydride obtained from this reaction was entirely the same as the product put in, i.e., it was a finely crystalline powder with an average grain size of 50 microns which was self-igniting in air. If the process is performed without the above-mentioned excess hydrogen, but at temperatures above 310°C, while following the procedure of Example 2 except for operating at 340°C, a finely crystalline powder which is self-igniting in air and has an average grain size of 50 microns is also obtained.

EXAMPLE 6

This example describes the preparation of preparation of the non-sticking and likewise non-self-igniting but finely granular alkali metal hydride in accordance with the invention by grinding the coarsely granular one.

40 kg of the sodium hydride prepared in accordance with the invention and having an average grain size of 500 microns, 10 kg of paraffin oil (B.P. 300°–320°C) and 30 kg of benzine (B.P. 60°–70°C) are charged under nitrogen gas shielding into a revolving ball mill of 200 liters capacity containing balls of 10 to 50 mm diameter. After running the mill for 6 hours the suspension of sodium hydride in oil and benzine is drained into a paddle dryer which is connected to a condenser, a receiver and a vacuum pump.

The evaporation of the benzine is performed first under normal pressure until the sodium hydride and oil mixture has been warmed to 60° to 70°C. The remaining benzine is removed by evaporation at reduced pressure of about 10 mm to a maximum temperature of 90°C. 50 kg of a non-sticking, non-self-igniting sodium hydride powder is obtained having a content of 80% NaH and 20% paraffin oil and an average grain size of 13 microns.

In conclusion it is to be noted with regard to the Examples that at the beginning the air in the reaction vessel is always replaced by nitrogen and this nitrogen is then replaced by hydrogen. The sodium hydride that forms in the reaction is removed from the reaction vessel through a tube by means of hydrogen, as described in German Petty Patent No. 71.127 53.

EXAMPLE 7 a. 80 kg of sodium hydride powder (fineness 10 microns) were placed in a vessel provided with a side-scraping agitator. A mixture of 60 kg of benzine having a boiling range of 80° to 100°C and 20 kg of paraffin oil having a boiling range of 280° to 320°C was then added, the entire mixture being kept under agitation. The mixture was then continued to be agitated for 5 minutes while at the same time air was excluded by covering the reaction mixture with hydrogen. In this manner a suspension of sodium hydride, benzine and oil was produced, having a hydride content of 50 wt-%. This mixture was then heated to about 80°C while continuing to pass small amounts of hydrogen through the space over the surface of the liquid inside the vessel. Distillation of the benzine was thereby begun and its removal completed by a slow temperature rise to 110°C. The end product was a white, non-sticking flowable powder which contained 80% sodium hydride and 20% paraffin oil, which did not ignite upon contact with atmospheric air, and which had a specific gravity of about 1.0 and a bulk weight of about 0.8.

b. Since it is known that sodium tertiary butylate cannot readily be produced directly from tertiary butanol using metallic sodium, sodium hydride is used to effect the reaction quantitatively and favorably. 58 g of the sodium hydride powder produced in (a) were mixed with 1 liter of tertiary butanol for the formation of sodium tertiary butylate. Hydrogen evolution set in immediately at the rate of 90 liters per hour. After about ½ hour the reaction was completed.

c. The process of (b) was repeated except that instead of sodium hydride coated with paraffin oil there was used 58 grams of sodium hydride coated with solid paraffin wax in the same manner and proportion as in (a). The reaction proceeded much more slowly, hydrogen being evolved at the rate of 40 liters per hour.

d. Unreacted butanol in (b) and (c) was removed from the conversion products by evaporation, and afterwards the coating agent of the sodium hydride was removed in each case by extraction with benzine. The extraction time necessary for the complete removal of the paraffin of (c) was a little more than twice as long as for removal of the paraffin oil of (b).

EXAMPLE 8

1 kg lithium hydride powder (fineness 10 u) was suspended as described in Example 7 in a mixture of 0.25 kg of paraffin oil (boiling range 280°–320°C) and 0.75 kg of benzine (boiling range 80°–110°C). The suspension was further treated as described in Example 7. Following distillation for removal of the benzine, a white non-sticking powder was obtained which did not ignite upon contact with atmospheric air and which contained 80% lithium hydride and 20% paraffin oil.

EXAMPLE 9

A series of experiments were conducted to determine the optimum rate of sodium addition when proceeding in accordance with the instant invention. A 500 liter reactor was used in an apparatus of the type schematically depicted in the appended drawing; the stirrer used therein was of the anchor-type. The relationship of, or dependence of, optimum sodium dosing on stirrer rpm and the amount of pre-introduced sodium at the indicated hydrogen pressure and reaction temperature is set forth in Table 1, below.

TABLE 1

| Rate of Stirrer Rotation (rpm) | Pre-introduced Amount of Sodium Hydride | Sodium Dosing (kg/h) | Pressure $H_2$ (atm-abs) | Temp. (°C) |
|---|---|---|---|---|
| 30 | 150 | 3 | 4 | 300 |
| 45 | 150 | 4,5 | 4 | 300 |
| 60 | 150 | 6 | 4 | 300 |
| 60 | 150 | 6 | 4 | 300 |
| 60 | 250 | 9 | 4 | 300 |
| 60 | 350 | 12 | 4 | 300 |
| 60 | 150 | 6 | 4 | 300 |
| 60 | 150 | 7,5 | 6 | 300 |
| 60 | 150 | 9 | 8 | 300 |
| 60 | 150 | 6 | 4 | 300 |
| 60 | 150 | 8 | 4 | 320 |
| 60 | 150 | 10 | 4 | 340 |

The alkali metal hydrides which the process of this invention yields are coarsely crystalline white free flowing powders, containing no contaminating foreign matter, in which no unreacted alkali metals are detectable either analytically or optically under the microscope. The average particle size of sodium hydride produced is from 400 to 600 microns, when proceeding in accordance with the invention; the hydride produced does not spontaneously ignite in air.

It will be understood that the specification and examples are illustrative but not limitative of the present invention and that other embodiments within the spirit and scope of the invention will suggest themselves to those skilled in the art.

What is claimed is:

1. In a process for the continuous preparation of an alkali metal hydride which process comprises continuously reacting a liquid alkali metal with hydrogen in the presence of pre-introduced alkali metal hydride, the improvement which comprises employing the hydrogen and alkali metal reactants and the pre-introduced and formed alkali metal hydride as the sole constituents of the reaction mixture, introducing substantially stoichiometric quantities of liquid alkali metal and hydrogen into a closed reaction vessel in amounts per unit time no larger than the corresponding amount of alkali metal hydride formed in such unit time, the hydrogen pressure in said reaction vessel being between 2 and 10 atmospheres gauge, agitating the vessel contents, and maintaining an alkali metal concentration of not more than 3 percent by weight, based on the alkali metal hydride present in the reactor, to produce alkali metal hydride in colorless coarsely crystalline powder form of 100 to 1000 micron average particle size, the particles having a layer-like and non-porous compact structure and being nonself-igniting in air.

2. Improvement as claimed in claim 1 wherein the reaction vessel is at least 10 percent full of pre-introduced alkali metal hydride prior to charging of the alkali metal and hydrogen reactants.

3. Improvement as claimed in claim 1 in which the reaction temperature is about 300°C.

4. Improvement as claimed in claim 1 in which the reaction pressure is about 3 atmospheres gauge.

5. Improvement as claimed in claim 1 wherein the reaction temperature is above the melting point of the alkali metal reactant and such that the hydrogen partial pressure of the alkali metal hydride formed is smaller than the hydrogen pressure applied to the reaction.

6. Process as claimed in claim 1 wherein said alkali metal is sodium and the alkali metal hydride is sodium hydride.

7. Process as claimed in claim 1 wherein said alkali metal is potassium and the alkali metal hydride is potassium hydride.

8. Improvement as claimed in claim 1 wherein the alkali metal concentration is maintained at from 0.5 to 1 percent by weight, based on the alkali metal hydride present.

9. Improvement as claimed in claim 8 wherein the alkali metal is sodium and said alkali metal hydride is sodium hydride.

10. Improvement as claimed in claim 1 wherein said alkali metal hydride is agitated by mixing means at a circumferential velocity of 0.5 to 2 meters/second.

11. Improvement as claimed in claim 10 wherein the pre-introduced alkali metal hydride is maintained at a temperature of from 250° to 310°C.

12. Improvement as claimed in claim 11 wherein said temperature is from 275° to 300°C.

13. Improvement as claimed in claim 1 wherein said hydrogen pressure is from 3 to 6 atmospheres gauge.

14. Process as claimed in claim 1 wherein said alkali metal hydride produced in coarsely crystalline powder form is ground to approximately 10 to 15µ in a hydrocarbon mixture of a high-boiling liquid saturated hydrocarbon boiling in the range of about 220°C to 400°C and a lower boiling hydrocarbon boiling in the range of 20°C to 160°C, to form a finely granular alkali metal hydride, the amount of the high-boiling hydrocarbon in grams per gram of alkali metal hydride being 2.5 divided by the ground particle size in microns, and thereafter removing said lower boiling hydrocarbon.

15. Process as claimed in claim 14 wherein said high boiling liquid saturated hydrocarbon is a paraffin boiling in the range of from about 280° to 320°C.

* * * * *